July 15, 1930. J. J. VANHORN 1,770,822
SIGNALING APPARATUS
Filed Oct. 20, 1928

INVENTOR:
J. J. Vanhorn,
BY
His ATTORNEY

Patented July 15, 1930

1,770,822

UNITED STATES PATENT OFFICE

JAMES J. VANHORN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

SIGNALING APPARATUS

Application filed October 20, 1928. Serial No. 313,751.

My invention relates to signaling apparatus, and particularly to apparatus for indicating at one point, the condition of a plurality of devices located at another point by means of a single pair of line wires extending between such points.

I will describe two forms of apparatus embodying my invention, and will then point out the novel features thereof in claims.

Figure 1:
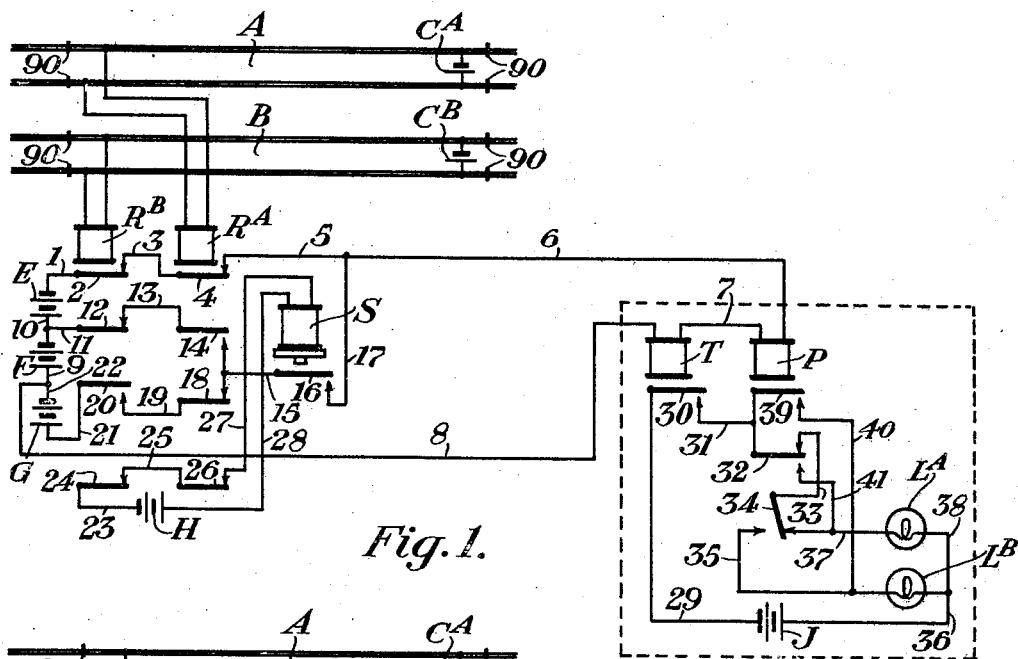
Figure 2:
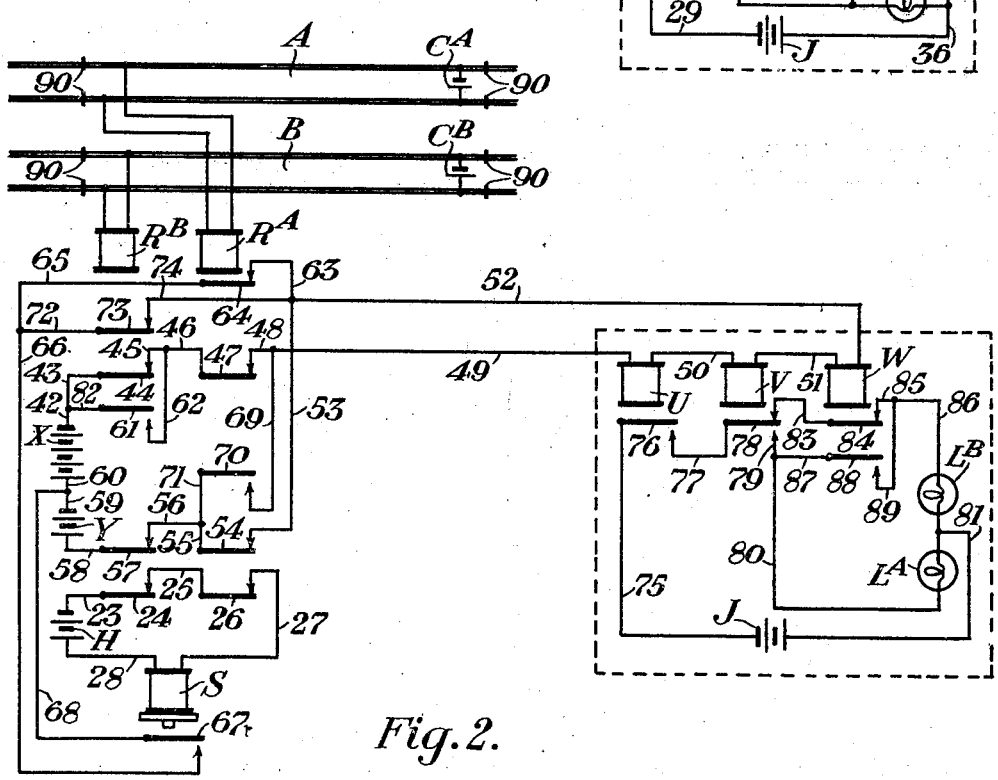

In the accompanying drawing, Fig. 1 is a diagrammatic view illustrating one form of signaling apparatus embodying my invention. Fig. 2 is a similar view showing a modified form of the apparatus illustrated in Fig. 1, and also embodying my invention.

Similar reference characters refer to similar parts in both views.

Referring first to Fig. 1, the reference character A designates a section of railway track which is insulated from the adjacent track by means of insulated joints 90, and the reference character B designates a similar section, here shown as part of a parallel track. Section A is provided with a track circuit comprising a track relay $R^A$ connected across the rails adjacent one end of the section and a track battery $C^A$ connected across the rails adjacent the other end of the section. Section B is provided with a similar track circuit comprising a track relay $R^B$ connected across the rails adjacent one end of the section, and a track battery $C^B$ connected across the rails adjacent the other end of the section.

Associated with track relays $R^A$ and $R^B$ is a slow acting relay S which is arranged to be energized only when these track relays are both energized. The pick-up circuit for relay S passes from a suitable source such as a battery H, through wire 23, front contact 24 of track relay $R^B$, wire 25, front contact 26 of track relay $R^A$, wire 27, winding of relay S, and wire 28 back to battery H. Relay S is, therefore, de-energized when a train occupies either section A or section B.

Located at a remote point, such for example as a train despatcher's office, are a neutral relay T, and a polarized relay P. These relays are constructed in such manner that a larger current is required to operate relay T than is required to operate relay P. As here shown, relay P is of the usual polarized direct current type, and comprises two neutral contacts 32 and 39, and a polar contact 34, which may be moved into either a right-hand or normal position, as shown in the drawing, or into a left-hand or reverse position, depending upon the polarity of the current supplied to the relay. Direct current polarized relays of the type described are customarily arranged so that when the relay is de-energized the polar contact remains in the position to which it was last moved.

The relays T and P control indicators here shown as two electric lamps $L^A$ and $L^B$, which inform the despatcher concerning the condition of track sections A and B.

As shown in the drawing, sections A and B are both unoccupied, track relays $R^A$ and $R^B$ are both energized, and slow acting relay S is energized. A first circuit for relays T and P is then closed, and current flows from two batteries E and F in series through wire 1, front contact 2 of track relay $R^B$, wire 3, front contact 4 of track relay $R^A$, wires 5 and 6, winding of relay P, wire 7, winding of relay T, and wires 8 and 9 back to batteries E and F in series. The magnitude of the current which flows in this first circuit is sufficient to operate both relays T and P, and the polarity of this current is what I shall term "normal polarity," so that, under these conditions, relays T and P are both energized, and contact 34 of relay P occupies its normal position. When relays T and P are both energized, lamps $L^A$ and $L^B$ are both dark, thereby informing the despatcher that track sections A and B are both unoccupied.

I will now assume that section B remains unoccupied, but that a train enters section A, thereby de-energizing track relay R<sup>A</sup>. The first circuit for relays T and P is then opened at front contact 4 of track relay R<sup>A</sup>, and at the same time, the circuit for relay S is opened at front contact 26 of track relay R<sup>A</sup>. Due, however, to the slow-acting characteristics of relay S, an interval of time elapses after the opening of relay R<sup>A</sup>, and prior to the opening of relay S. During this time interval relays T and P are both de-energized, and this time interval is long to insure that both these relays open. When back contact 16 of relay S closes, at the expiration of its holding interval, a second circuit for relays T and P is closed, and current then flows from battery F through wire 11, front contact 12 of track relay R<sup>B</sup>, wire 13, back contact 14 of track relay R<sup>A</sup>, wire 15, back contact 16 of slow-acting relay S, wires 17 and 6, winding of relay P, wire 7, winding of relay T, and wires 8 and 9 back to battery F. The current which flows in this second circuit for relays T and P is of the same polarity as, but is less in magnitude than the current which flows in the circuit first traced for these relays, and is sufficient to operate relay P, but is not sufficient to operate relay T. It follows that when this second circuit is closed relay T is open, but relay P is closed in the normal direction. A circuit for lamp L<sup>A</sup> is then closed, and current flows from a suitable source, such as a battery J, through wire 29, back contact 30 of relay T, wire 31, front contact 32 of relay P, wire 33, normal contact 34 of relay P, wire 37, lamp L<sup>A</sup>, and wires 38 and 36 back to battery J. Under these conditions, therefore, lamp L<sup>A</sup> is lighted, indicating that section A is occupied by a train.

I will next assume that both sections A and B are unoccupied, and that a train enters section B. Relay R<sup>B</sup> therefore becomes de-energized, and when this relay opens, the circuit first traced for relays T and P is opened at front contact 2 of relay R<sup>B</sup>, and at the same time, the circuit for relay S is opened at front contact 24 of relay R<sup>B</sup>. As was previously explained relay S does not open until the expiration of a time interval which is long enough to permit both relays T and P to open. When back contact 16 of relay S finally closes, a third circuit for relays T and P is closed, and current flows from a battery G through wires 22 and 8, winding of relay T, wire 7, winding of relay P, wires 6 and 17, back contact 16 of slow-acting relay S, wire 15, front contact 18 of track relay R<sup>A</sup>, wire 19, back contact 20 of track relay R<sup>B</sup>, and wire 21 back to battery G. The current which flows in this third circuit for relays T and P has the same magnitude as the current which flows in the second circuit for these relays but is of the opposite or reverse polarity, so that relay T is open and relay P is closed in the reverse direction. A circuit for lamp L<sup>B</sup> is then completed from battery J, through wire 29, back contact 30 of relay T, wire 31, front contact 32 of relay P, wire 33, reverse contact 34 of relay T, wire 35, lamp L<sup>B</sup>, and wire 36 back to battery J. Lamp L<sup>B</sup> is, therefore, lighted to indicate that section B is occupied by a train.

Finally, I will assume that trains occupy both sections A and B. Track relays R<sup>A</sup> and R<sup>B</sup> are, therefore, both de-energized, and all three circuits for relays T and P are then open, so that relays T and P are both open. Under these conditions, circuits for lamps L<sup>A</sup> and L<sup>B</sup> are both closed. The circuit for lamp L<sup>A</sup> passes from battery J, through wire 29, back contact 30 of relay T, wire 31, back contact 32 of relay P, wires 41 and 37, lamp L<sup>A</sup>, and wires 38 and 36 back to battery J. The circuit for lamp L<sup>B</sup> passes from battery J, through wire 29, back contact 30 of relay T, wire 31, back contact 39 of relay P, wire 40, lamp L<sup>B</sup>, and wire 36, back to battery J. Lamps L<sup>A</sup> and L<sup>B</sup> are, therefore, both lighted, indicating that track sections A and B are both occupied.

It will be noted from the foregoing that when track sections A and B are both unoccupied, so that track relays R<sup>A</sup> and R<sup>B</sup> are both energized, relays T and P are supplied with current having a magnitude which is sufficient to operate both relays. It will also be noted from the foregoing, that when a train enters either section A or section B, so that track relay R<sup>A</sup> or R<sup>B</sup> becomes de-energized, relays T and P are then supplied with current having a magnitude which is less than the magnitude of the current supplied to these relays when sections A and B are both unoccupied, and this current of reduced magnitude is sufficient to operate relay P but is not sufficient to operate relay T. With standard apparatus for accomplishing these results it might happen that when a train entered either section A or section B to de-energize track relay R<sup>A</sup> or track relay R<sup>B</sup>, this current of reduced magnitude would be supplied to relays T and P before these relays had opened, and relay T might under some conditions be held up by this current, thereby producing an undesirable condition. With apparatus embodying my invention, however, this undesirable condition cannot exist. That is to say, when a train enters either section A or section B, so that relay R<sup>A</sup> or R<sup>B</sup> becomes de-energized, the first circuit for relays T and P is opened, and these relays are completely de-energized until either the second or third circuits for these relays is closed at back contact 16 of relay S. The circuit for relay S is opened at the same time as the first circuit for relays T and P, but due to the slow-acting characteristics of relay S, back contact 16 of relay S does not become closed until after a time interval has elapsed, which time interval is sufficiently long to insure that relays T and P both open. When the second or third circuit for relays T and P is then closed, relay T remains open but relay P becomes energized, because the magnitude of the current supplied to these relays is sufficient to operate relay P but is not sufficient to operate relay T.

In the modified form of apparatus shown in Fig. 2, I employ three neutral relays U, V, and W, instead of the neutral relay T and the polarized relay P used in Fig. 1. These relays are so arranged that they require progressively larger currents to cause the relays to pick-up, relay W picking up with the smallest value of current, and relay U with the largest value of current.

As shown in Fig. 2, track sections A and B are both unoccupied, relays $R^A$ and $R^B$ are both energized, and slow-acting relay S is also energized. Under these conditions, current is supplied to relays U, V, and W in series from two batteries X and Y in series over a first circuit which passes from battery X through wires 42 and 43, front contact 44 of track relay $R^B$, wires 45 and 46, front contact 47 of track relay $R^A$, wires 48 and 49, winding of relay U, wire 50, winding of relay V, wire 51, winding of relay W, wires 52 and 53, front contact 54 of track relay $R^A$, wires 55 and 56, front contact 57 of track relay $R^B$, and wire 58 back to battery Y. It will be noted that batteries X and Y are connected in series in this circuit, and the magnitude of the current supplied to relays U, V, and W over this circuit is sufficient to pick-up all three of these relays. Lamps $L^A$ and $L^B$ are then both dark, indicating that track sections A and B are both unoccupied.

I will now assume that track sections A and B are both unoccupied, and that a train enters track section B. Relay $R^B$ therefore becomes de-energized. When front contact 44 of this relay opens, the first circuit for relays U, V, and W is opened, and when front contact 24 of this relay opens, the circuit for relay S is opened. Relay S does not open, however, until after a brief time interval has elapsed. During this time interval relays U, V, and W are completely deenergized, and this time interval is sufficiently long to permit all three of these relays to open. When back contact 67 of relay S closes, a second circuit for relays U, V, and W is closed, and current flows from battery X through wires 42 and 82, back contact 61 of track relay $R^B$, wires 62 and 46, front contact 47 of track relay $R^A$, wires 48 and 49, winding of relay U, wire 50, winding of relay V, wire 51, winding of relay W, wires 52 and 63, front contact 64 of track relay $R^A$, wires 65 and 66, back contact 67 of relay S, and wires 68 and 60 back to battery X. The magnitude of the current which flows in this second circuit for relays U, V, and W is less than the magnitude of the current which flows in the first circuit for these relays, and is sufficient to operate relays V and W, but is not sufficient to operate relay U. When this circuit is closed, therefore, relays V and W are picked up and relay U is open. Under these conditions, a circuit for lamp $L^B$ is closed and current flows from battery J through wire 75, back contact 76 of relay U, wire 77, front contact 78 of relay V, wire 83, front contact 84 of relay W, wires 85 and 86, lamp $L^B$, and wire 81 back to battery J. Lamp $L^B$ is, therefore, lighted, indicating that section B is occupied.

I will next assume that with sections A and B both unoccupied, a train enters track section A. Track relay $R^A$ then becomes de-energized, and the first circuit for relays U, V, and W is opened at front contact 47 of track relay $R^A$. At the same time, the circuit for slow-acting relay S is opened at front contact 26 of track relay $R^A$. After the expiration of a time interval relay S opens and closes its back contact. During this time interval relays U, V, and W are de-energized, and this time interval is sufficiently long to permit all three of these relays to open. When back contact 67 of relay S closes, a third circuit for relays U, V, and W is then closed, and current flows from a battery Y through wires 59 and 68, back contact 67 of slow-acting relay S, wires 66 and 72, front contact 73 of track relay $R^B$, wires 74 and 52, winding of relay W, wire 51, winding of relay V, wire 50, winding of relay U, wires 49 and 69, back contact 70 of track relay $R^A$, wires 71 and 56, front contact 57 of track relay $R^B$, and wire 58 back to battery Y. The magnitude of this current is sufficient to operate relay W but is not sufficient to operate relays U and V, so that when this circuit is closed relay W is picked up, but relays U and V are both open. Under these conditions, a circuit for lamp $L^A$ is lighted and current flows from battery J through wire 75, back contact 76 of relay U, wire 77, back contact 78 of relay V, wires 79 and 80, lamp $L^A$, and wire 81 back to battery J. Lamp $L^A$ therefore becomes lighted indicating that track section A is occupied.

Finally, I will assume that trains occupy both track sections A and B, so that relays $R^A$ and $R^B$ are both de-energized. All three circuits for relays U, V, and W, are then opened at front contacts of track relays $R^A$ and $R^B$, and relays U, V, and W are all de-energized. Under these conditions circuits for lamps $L^A$ and $L^B$ are both closed. The circuit for lamp $L^A$ passes from battery J through wire 75, back contact 76 of relay U, wire 77, back contact 78 of relay V, wires 79 and 80, lamp $L^A$, and wire 81 back to battery J. The circuit for lamp $L^B$ passes from battery J through wire 75, back contact 76 of relay U, wire 77, back contact 78 of relay V, wires 79 and 87, back contact 88 of relay W, wires 89 and 86, lamp L$^B$, and wire 81 back to battery J. Lamps L$^A$ and L$^B$ are then both lighted indicating that track sections A and B are both occupied.

It will be noted that in Fig. 2, when track relays R$^A$ and R$^B$ are both energized, as when track sections A and B are both unoccupied, relays U, V, and W, are supplied with current having a magnitude which is sufficient to energize all three of these relays, but that when either track relay R$^B$ or track relay R$^A$ is de-energized, as when a train occupies track section B, or track section A, relays U, V, and W are then supplied with current having a magnitude which is sufficient to energize only relays V and W, or relay W depending upon whether section B or section A is the occupied section. With standard apparatus for obtaining the above results it might happen that when a train entered either section A or section B to de-energize track relay R$^A$ or R$^B$, relays U, V, and W would be supplied with current of decreased magnitude before these relays opened, and one or more of the relays U, V, or W which should open under normal conditions might be held up, thereby producing an undesirable condition. With apparatus embodying my invention, however, this undesirable condition cannot exist. For, when a train enters section A or section B to de-energize either track relay R$^A$ or R$^B$, relays U, V, and W are then completely de-energized until slow-acting relay S opens and closes its back contact 67. The circuit for slow-acting relay S is opened at the same time as the circuit over which current is normally supplied to relays U, V, and W when track relays R$^A$ and R$^B$ are both energized, but due to the slow-acting characteristics of relay S, relay S does not open and close its back contact 67, until after a time interval has elapsed which is sufficiently long to permit relays U, V, and W to open. When relay S does open, therefore, relays U, V, and W are then all open, and it follows that a relay which should be open under these conditions will remain open, since the corresponding relay will then be supplied with current having a magnitude which is not sufficient to pick up the relay.

Although I have herein shown and described only two forms of signaling apparatus embodying my invention, it is understood that various changes and modifications may be made therein within the scope of the appended claims without departing from the spirit and scope of my invention.

Having thus described my invention, what I claim is:

1. In combination, two relays selectively responsive to currents of different magnitudes, a circuit for said relays including means for supplying said relays in series with current of one magnitude, means for at times interrupting said circuit and for supplying said relays with a current of different magnitude after the expiration of a time interval which is sufficient to permit both relays to open, and indicators controlled by said relays.

2. In combination, a first and a second relay, a slow-acting relay controlled by said first and second relays, a neutral relay and a polarized relay requiring currents of different magnitudes to energize the relays, means controlled by said first and second relays and said slow-acting relay for supplying said neutral and said polarized relays in series with currents of different magnitudes and polarities to selectively operate said neutral and said polarized relays, and indicators selectively controlled by said neutral and polarized relays.

3. In combination, a first and a second normally energized relay, means for at times selectively de-energizing said relays, a slow-acting relay controlled by front contacts of each of said first and second relays, a neutral relay and a polarized relay, a first circuit for said neutral and said polarized relays including front contacts of said first and second relays; a second circuit for said neutral and said polarized relays including a front contact of said first relay, a back contact of said second relay, and a back contact of said slow-acting relay; a third circuit for said neutral and said polarized relays including a back contact of said first relay, a front contact of said second relay, and a back contact of said slow-acting relay, and indicators selectively controlled by said neutral and said polarized relays.

4. In combination, a first and a second relay, a slow-acting relay controlled by said first and second relays, a neutral and a polarized relay located at a remote point and requiring currents of different magnitudes to energize the relays, means including a single pair of line wires and controlled by said first and second relays and said slow-acting relay for supplying said neutral and said polarized relays in series with currents of different magnitudes and polarities to selectively operate said neutral and said polarized relays, and indicators selectively controlled by said neutral and said polarized relays.

5. In combination, a neutral relay and a polarized relay, two indicators, means for energizing one or the other of said indicators when said neutral relay is de-energized depending upon whether said polarized relay is energized in the normal or reverse direction, and means for energizing both of said indicators when said neutral and polarized relays are both de-energized.

6. In combination, a first and a second section of railway track, a first track relay responsive to traffic conditions in said first section, a second track relay responsive to traffic conditions in said second section, a slow-acting relay controlled by said first and second relays, a neutral and a polarized relay located at a remote point and requiring currents of different magnitudes to energize the relays, means including a single pair of line wires and controlled by said first and second track relays and said slow-acting relay for supplying said neutral and said polarized relays in series with currents of different magnitudes and polarities to selectively operate said neutral and said polarized relays, and indicators selectively controlled by said neutral and said polarized relays.

In testimony whereof I affix my signature.

JAMES J. VANHORN.